United States Patent [19]

Kováts et al.

[11] Patent Number: 5,762,803
[45] Date of Patent: Jun. 9, 1998

[54] SILICON DIOXIDE BASED MICROSPHERES FOR RAPID CHROMATOGRAPHIC SEPARATION OF BIOMOLECULES

[75] Inventors: Ervin Kováts, Lausanne; László Jelinek, Mannedorf, both of Switzerland; Róbert Ohmacht, Pace, Hungary

[73] Assignee: CU Chemie Uetikon AG, Uetikon am See, Switzerland

[21] Appl. No.: 852,746

[22] Filed: May 6, 1997

Related U.S. Application Data

[63] Continuation of Ser. No. 501,344, Jul. 12, 1995, abandoned.

[51] Int. Cl.$^6$ .................................................. B01D 15/08
[52] U.S. Cl. ................... 210/635; 210/656; 210/198.2; 210/502.1
[58] Field of Search ...................... 210/635, 656, 210/657, 658, 659, 198.2, 502.1; 502/407, 408

[56] References Cited

U.S. PATENT DOCUMENTS

| | | | |
|---|---|---|---|
| 3,722,181 | 3/1973 | Kirkland | 210/198.2 |
| 3,795,313 | 3/1974 | Kirkland | 210/198.2 |
| 3,922,392 | 11/1975 | Kohlschutter | 427/215 |
| 4,743,545 | 5/1988 | Torobin | 435/41 |
| 4,874,518 | 10/1989 | Kirkland | 210/198.2 |
| 5,032,266 | 7/1991 | Kirkland | 210/198.2 |
| 5,045,201 | 9/1991 | Dubois | 210/502.1 |
| 5,108,595 | 4/1992 | Kirkland | 210/198.2 |
| 5,212,143 | 5/1993 | Torobin | 502/415 |

FOREIGN PATENT DOCUMENTS 574642 12/1993 European Pat. Off. ............ 210/198.2

*Primary Examiner*—Ernest G. Therkorn
*Attorney, Agent, or Firm*—Loeb & Loeb LLP

[57] ABSTRACT

Disclosed is a method for the rapid chromatographic separation and analysis of biomolecules using non-porous, monosized silicon dioxide microspheres covered with a dense layer of triorganylsilyl groups.

3 Claims, 9 Drawing Sheets

SILICON DIOXIDE BASED MICROSPHERES FOR RAPID CHROMATOGRAPHIC SEPARATION OF BIOMOLECULES

This is a continuation of application Ser. No. 08/501,344 filed on Jul. 12, 1995, now abandoned.

BACKGROUND OF THE INVENTION

Most stationary phases applied for the chromatographic analysis and preparative separation of biomolecules are surface modified silicon dioxide preparabions[1]. For preparative purposes precipitated silica with a high specific surface area is applied with large pore diameter in order to avoid molecular sieving effects and irreversible adsorption in the pores. If retention mechanism is based on hydrophobic interaction between biomolecules and the adsorbent, chromatography is often made in a chemically aggressive medium at high acidities or in buffers. Hence, the hydrolytic stability of the organic graft is an important parameter for the lifetime of the column and the reproducibility of the analysis. Finally, the surface modification must result grafts which completely shield the nature of the underlaying silica matrix in order to avoid adsorption on the bare silica.

It has been shown that by using triorganyl (dimethylamino)silanes as silylating agents fully hydrated silicon dioxide preparations can be covered with the densest possible monolayers even with triorganylsiloxy groups having bulky substituents. Such layers completely shield the silicon dioxide matrix and are stable and give reproducible results for at least during two years in a water/acetonitrile mixture at room temperature.

Redispersable, monodispersed, calcined, compact, non-porous silicon dioxide microspheres could also be surface treated with monofunctional (dimethylamnino)silanes as silylating agents[2]. As an example of a surface coating with exposed alkyl chains microspheres were prepared with a monolayer of tetradecyldimethylsiloxy (C14) graft to give a surface coverage of $\Gamma_{sox}=3.9$ µmol m$^{-2}$. For chromatographic separations we prefer the C14 coating to the popular octadecyldimethylsiloxy (C18) grafts. In fact, C18 grafts show in a scanning calorimeter an endothermic enthalpic effect around 25° C. probably due to the "melting" of the quasicristalline octadecyl heather. Consequently, the C18-coating is not in a well defined state around room temperature at which such phases are mostly used for analysis contrary to the C14-covered adsorbents where the corresponding phase change is around 0° C. Besides of this "soft" type non-polar graft with long alkyl chains a "hard" type surface was prepared with (3,3-dimethylbutyl)dimethyl (dimethylamino)silane as silylating agent. The resulting DMB-graft had a surface coverage of $\Gamma_{sox}=3.8$ µmol m$^{-2}$. These surfaces have a very good hydrolytic stability (see Example 3). The good resistance of the coating under aggressive conditions (80° C., acidic solution) was explained by the fact that the bulky 3,3-dimethybutyl substituent hinders the access of nucleophiles to the disiloxy anchoring sites. The hydrolytic stability of this "hard" non-polar coating seems to be even better than isopropylsiloxy grafts. In fact, the stability of layers prepared with (dimethylamino)silane silylating agents is due to two reasons. The first reason is the adequate choice of the substituent on the silicon (bulky substituents) but also as a second reason the high (highest possible) density of the organic coating largely contributes to the hydrolytic stability of the chemically bonded monolayer.

SUMMARY OF THE INVENTION

The preparation of non-porous, redispersable, monosized silicon dioxide microspheres is known. Also known is the use of triorganyl(dimethylamino)silanes as silylating agents for the grafting of dense layers onto the surface of rehydrated silicon dioxide preparations. The preparation of redispersable, monosized, non-porous silicon dioxide microspheres with such coatings has also been described. Surprisingly, dense surface layers on -redispersable, non-porous, monosized silicon dioxide microspheres yield chromatographic column packing materials which are suitable for the separation of biomolecules much faster than by any known method.

The object of this invention is the use of powders composed of redispersable, non-porous, monosized silicon dioxide microspheres with a dense surface layer of triorganysilyl groups as column packing material for the high speed chromatographic analysis of biomolecules.

A further object of this invention is the use of redispersable, non-porous, monosized silicon dioxide microspheres with a dense surface layer of 3,3-dimethylbutyl-dimethylsilyl groups as an adsorbent with a-hard, non-polar surface.

A further object of this invention is the use of redispersable, non-porous, monosized silicon dioxide microspheres -with a dense surface layer of tetradecyldimethyl-silyl groups as an adsorbent with a soft, non-polar surface.

DETAILED DESCRIPTION

Figure 1:
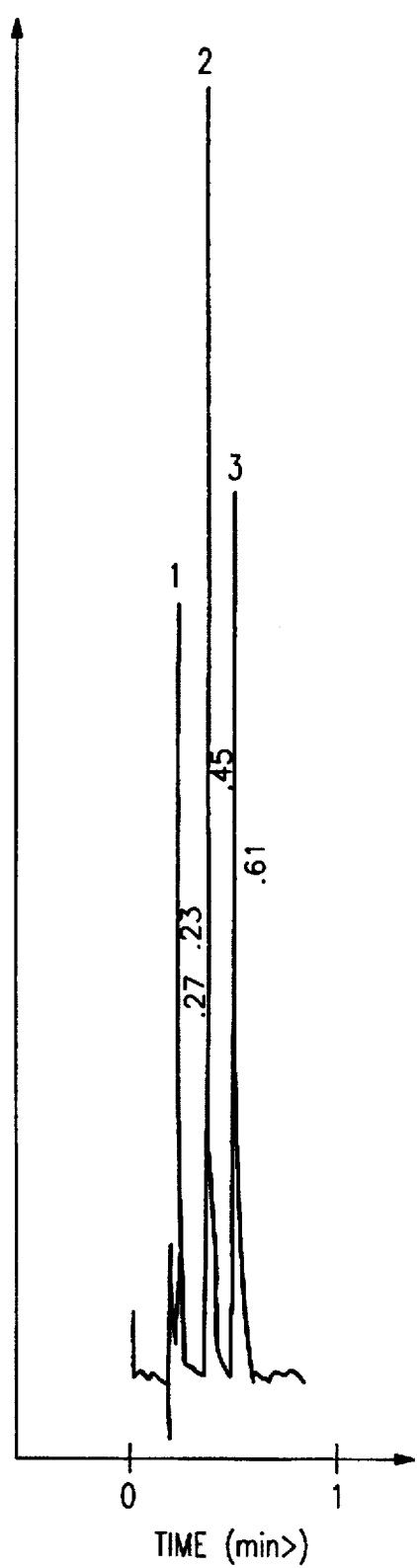
FIG. 1 shows the separation of a test mixture with a column packed with Kovasil MS-C14.

For the preparation of the column packing material the redispersable, non-porous, monosized silicon dioxide microspheres must be first redispersed in a non-protic solvent, such as acetonitrile, propionitrile, under the action of ultrasound. After redispersion the silylating agent is added, the suspension heated to reflux. After isolation and drying at 120° C./10$^{-3}$ Torr the powder is treated again with the same silylating agent in order to complete the surface layer. Another possibility is to wet the slightly agglomerated, redispersable powder by a non-polar type solvent such as cyclohexane, toluene or xylene, add the silylating agent ane treat the stirred suspension by ultrasound where the product is partly silylated and forms a monosized suspension. After heating to reflux for 10–30 h the product is isolated in a centrifuge. Elemental analysis shows that a nearly compact layer of alkyldimethylsiloxy layer is formed. The product may be treated a second time with the same silylating agent in order to complete silylation.

Using the derivatized final products short chromatographic columns (33×4.6 mm) were packed.

In the following the preparation of the adsorbents and their stability tests are described. Furthermore, the separation of low molecular weight compounds as well as that of biomolecules are illustrated in a few typical examples.

Compared with conventional packed columns the following advantages are observed:

The separation time is reduced by a factor 5–10.

The time of re-equblibration of the column, ready to start a new analysis after gradient elution is typically 1–2 min i.e. is reduced by a factor 5–10.

Eluents are environmental friendly i.e. they contain much less organic component.

EXAMPLE 1

Preparation of Kovasil MS-DMB. The starting material was Kovasil MS from Chemie Uetikon (Uetikon, Switzerland) composed of redispersable, non-porous, mono-sized silicon dioxide microspheres, rehydrated in water for 20 h. Specifications:

Particle diameter: 1.49 μm

Relative standard deviation of the diameter: 1.2%

Specific surface area (BET): 2.2 $m^2 g^{-1}$

A quantity of 10.0 g of the product was redispersed in 200 ml acetonitrile applying ultrasonic irradiation during 15 min. (3,3-dimethylbutyl)dimethyl(dimethylamino)silane (67.5 mg) was added to the suspension which was refluxed under an argon atmosphere during 12 h. The partly silylated product was isolated by centrifugation and washed with cyclohexane and finally dried. The dried product was transferred into a glass ampoule, the same silylating agent (60 mg) was added then the ampoule was cooled, evacuated and sealed. The closed ampoule was kept at 150° C. during 50 h. After cooling the ampoule was opened and the white powder was washed with cyclohexane and dried. Surface concentration of the (3,3-dimethylbutyl)dimethylsiloxy groups was $\Gamma_{sox}=4.0$ μmol $m^{-2}$. In the following this stationary phase will be designated as Kovasil MS-DMB. (The stationary phase silylated with the same method but with use of tetradecyl-dimethyl(dimethyilamino)silane as silylating agent will be designated as Kovasil MS-C14).

EXAMPLE 2

Test of a column packed with Kovasil MS-C14. Separation of a test mixture composed of toluene (1), butylbenzene (2) and pentylbenzene (3). Experimental: column: 33×4.6 mm; elution mode: isocratic; mobile phase: acetonitrile/water (AN/W=50/50 by volume); flow rate: 0.9 ml $min^{-1}$; pressure: 20 MPa; temperature: ambient; detector: UV 254 nm (see FIG. 1). Theoretical plate numbers, $N_x:N_{toluene}$:4100; $N_{butylbenzene}$: 6150; $N_{pentylbenzene}$: 7980. The increase of number of theoretical plates as a function of retention time was explained by extracolumn contributions of the chromatographic system to peak-broadening (with longer retention this contribution has a smaller effect).

EXAMPLE 3

Figure 2:
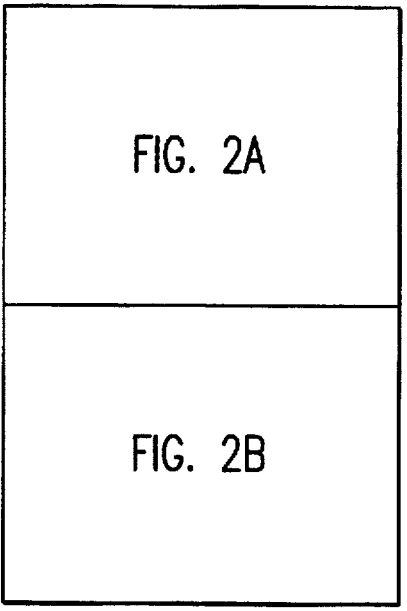
FIGS. 2A and 2B show relative retention as a function of time.
Figure 2A:
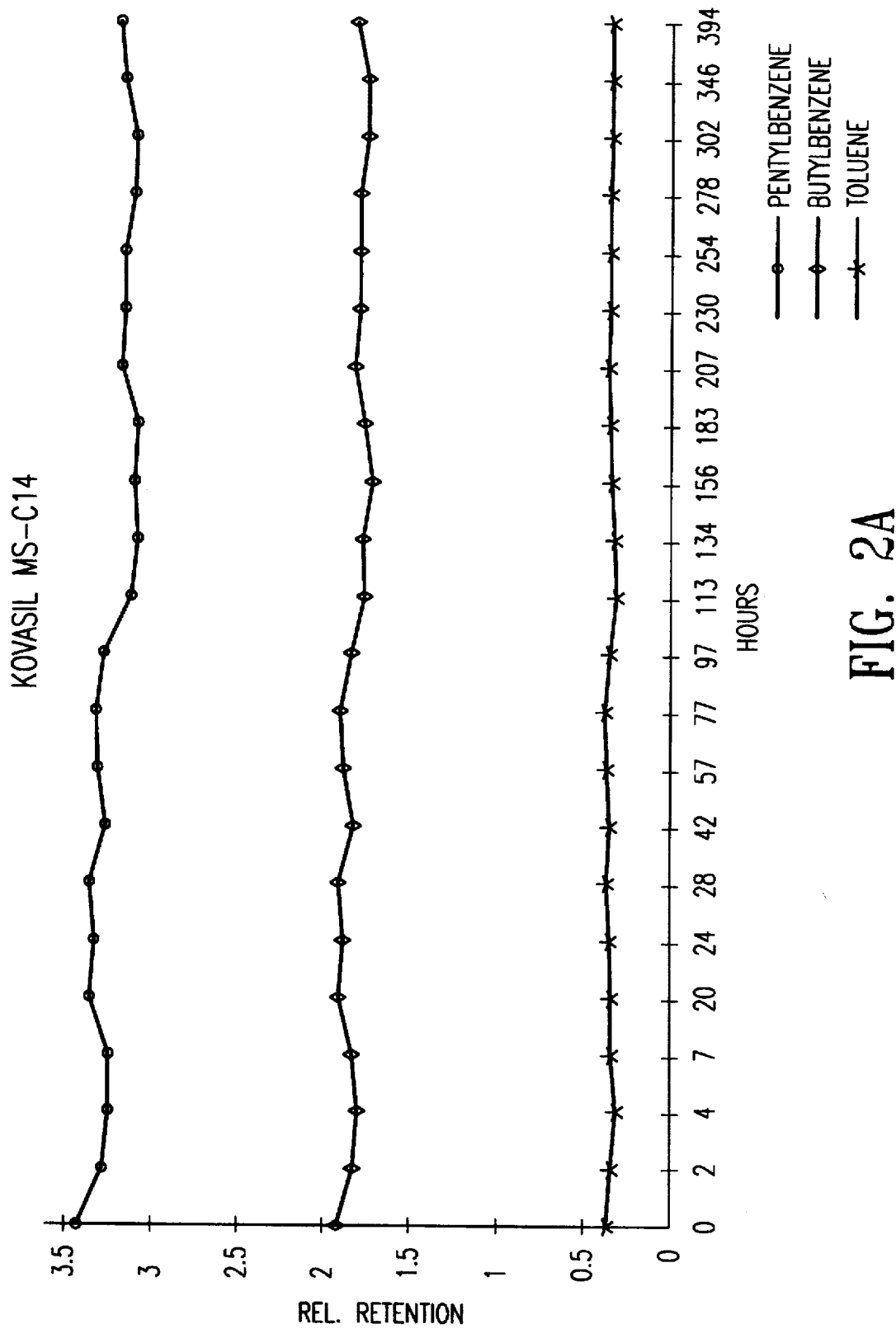
Figure 2B:
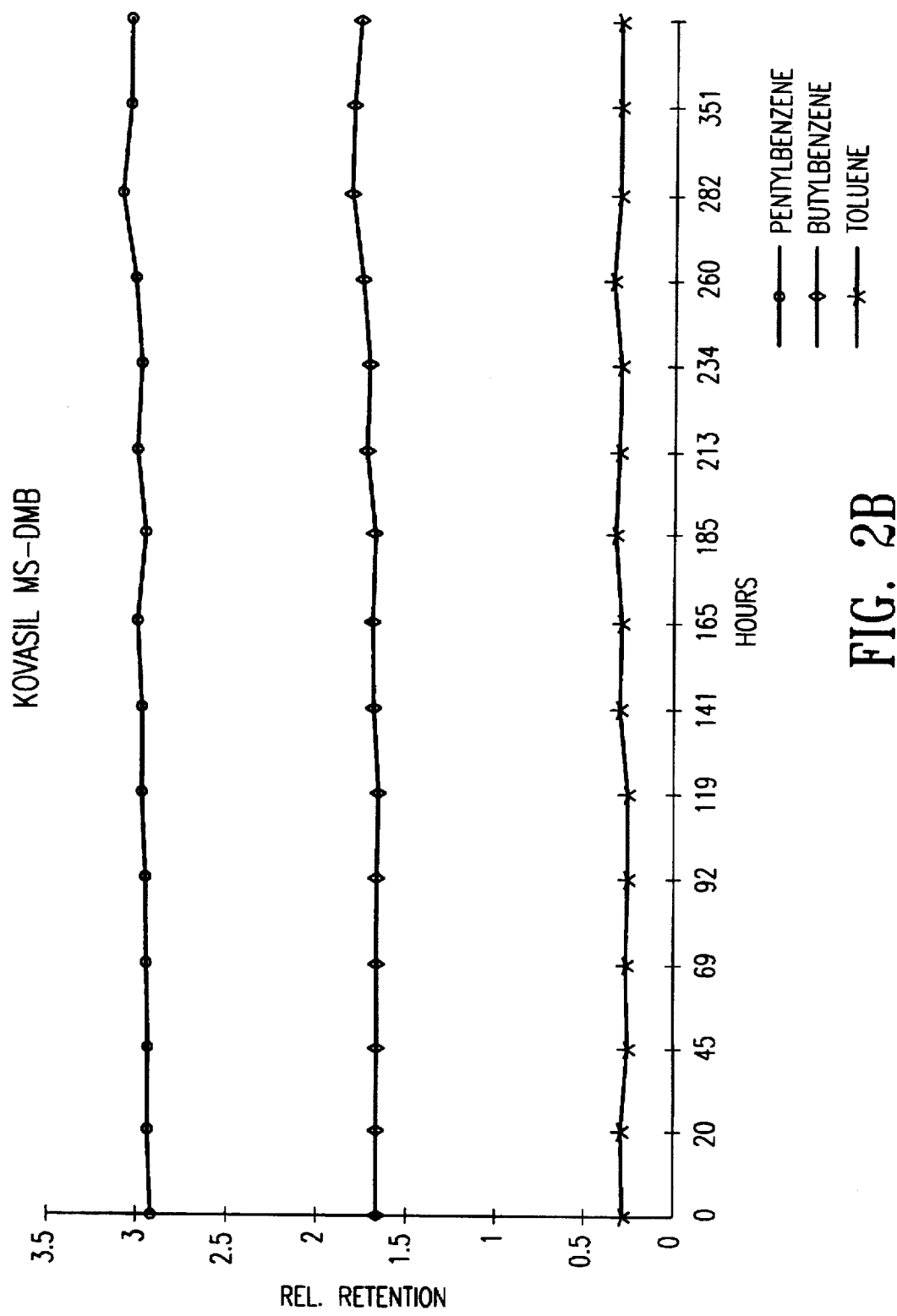

Hydrolytic stability of the stationary phases, Kovasil MS-C14 and Kovasil MS-DMB. Experimental: columns: 33×4.6 mm; mobile phase is a mixture of acetonitrile/water (AN/W=50/50 by volume) containing 0.12% trifluoroacetic acid (TFA); temperature: 80° C.; flow rate: 1.5 ml $min^{-1}$; pressure: 16 MPa. The columns were connected periodically to the chromatographic system (every 20 h) and the mixture of Example 2 was injected. Relative retention as a function of time are shown in FIG. 2. During the whole test period (400 h) the number of theoretical plates remained constant.

EXAMPLE 4

Figure 3:
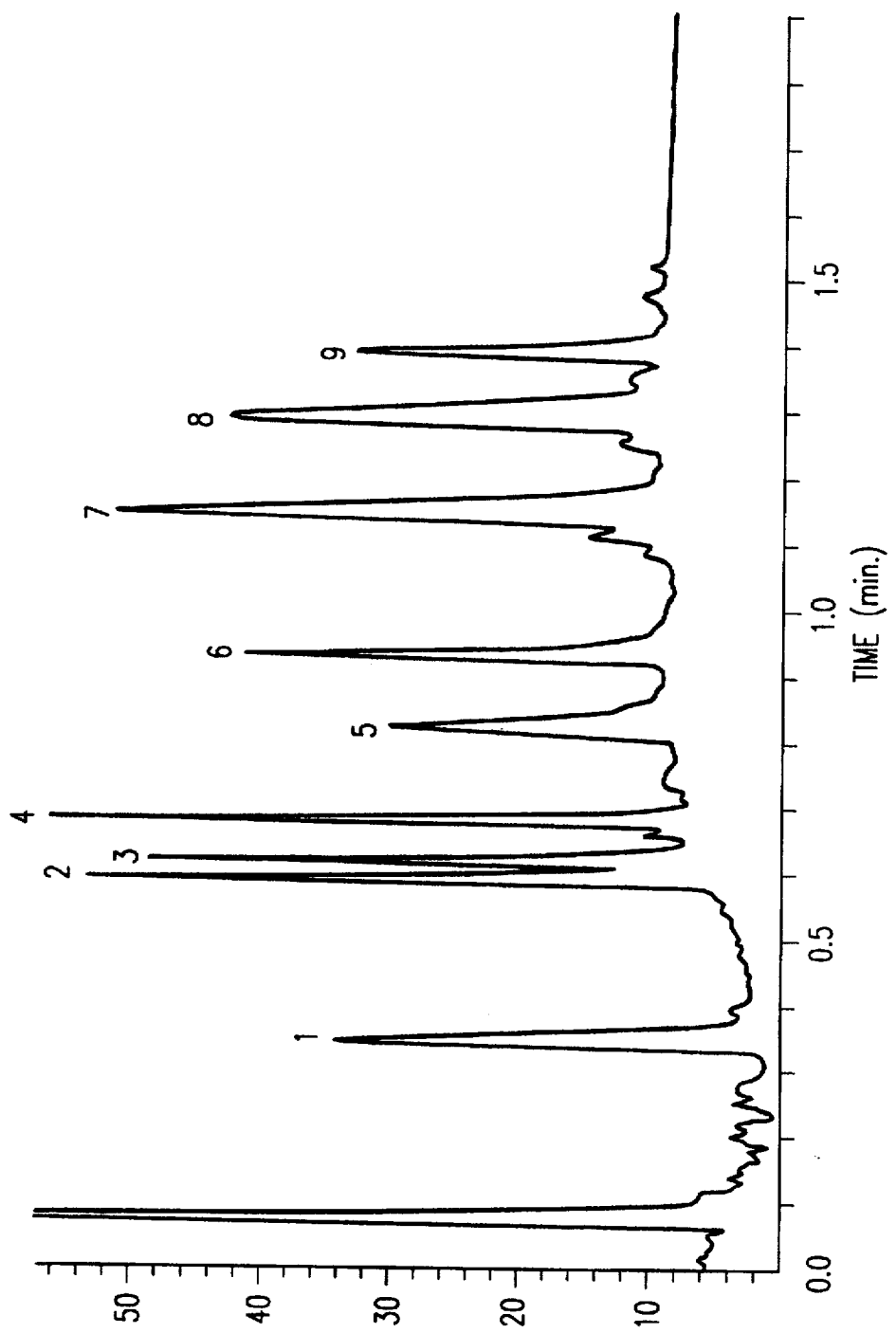
FIG. 3 shows the separation of a protein mixture on Kovasil MS-DMB.

Separation of a protein mixture of analytical importance on Kovasil MS-DMB Components: 1 ribonuclease, 2 cytochrom C (horse), 3 cytochrom C (bovin), 4 lysozyme, 5 conalbumin, 6 myoglobin, 7 β-lactoglobulin B, 8 β-lactoglobuihn A, 9 chymotrypsinogene. Experimental: column: 33×4.6 mm; elution mode: multilinear gradient by mixing A and B where eluent A is a mixture of AN/W=20/80 and eluent B is AN/W=90/10 both containing 0.12% trifluoroacetic acid (TFA); elution program: 0→0.5 min 3.6→27% B, 0.5→1 min 27→29% B, 1→1.2 min 29→37% B, 1.2→2 min 37→39% B, keep and return; flow rate: 3.0 ml $min^{-1}$; pressure at start 35.1 MPa; temperature: 80° C.; detector: WV 215 nm (see FIG. 3).

EXAMPLE 5

Figure 4:
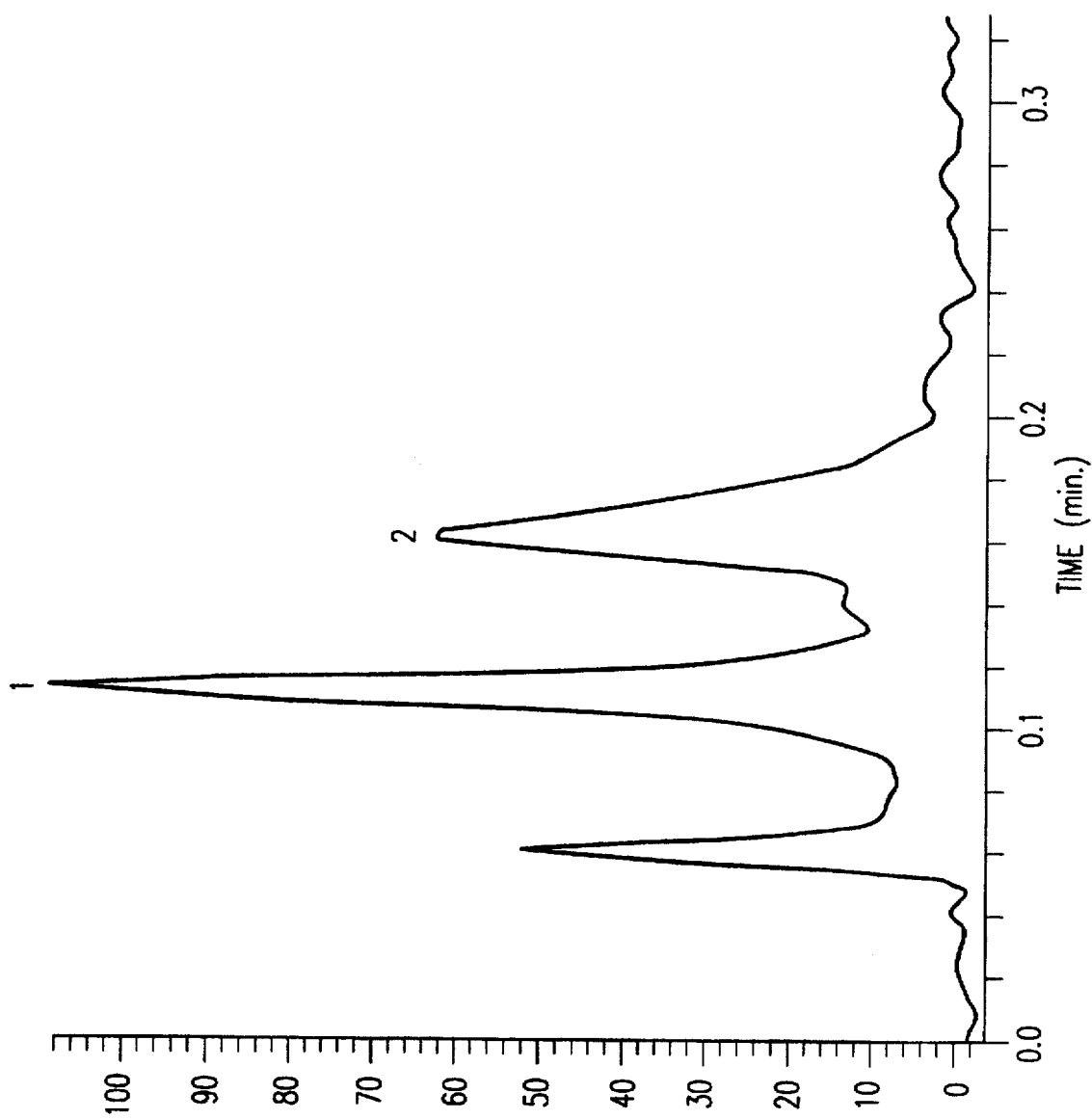
FIG. 4 shows the separation of beta-lactoglobulins on Kovasil MS-DMB.

Separation of β-lactoglobulins on Kovasil MS-DMB. Components: 1 β-lactoglobulin B, 2 β-lactoglobulin A. Experimental: column: 33×4.6 mm; elution mode: linear gradient by mixing A and B where eluent A is a mixture of AN/W=20/80 and eluent B is AN/W=90/10 both containing 0.12% trifluoroacetic acid (TFA); elution program: 0→0.8 min 28→100% B, keep and return; flow rate: 3.6 ml $min^1$; pressure at start 35 MPa; temperature: 90° C.; detector: UV 215 nm (see FIG. 4).

EXAMPLE 6

Figure 5:
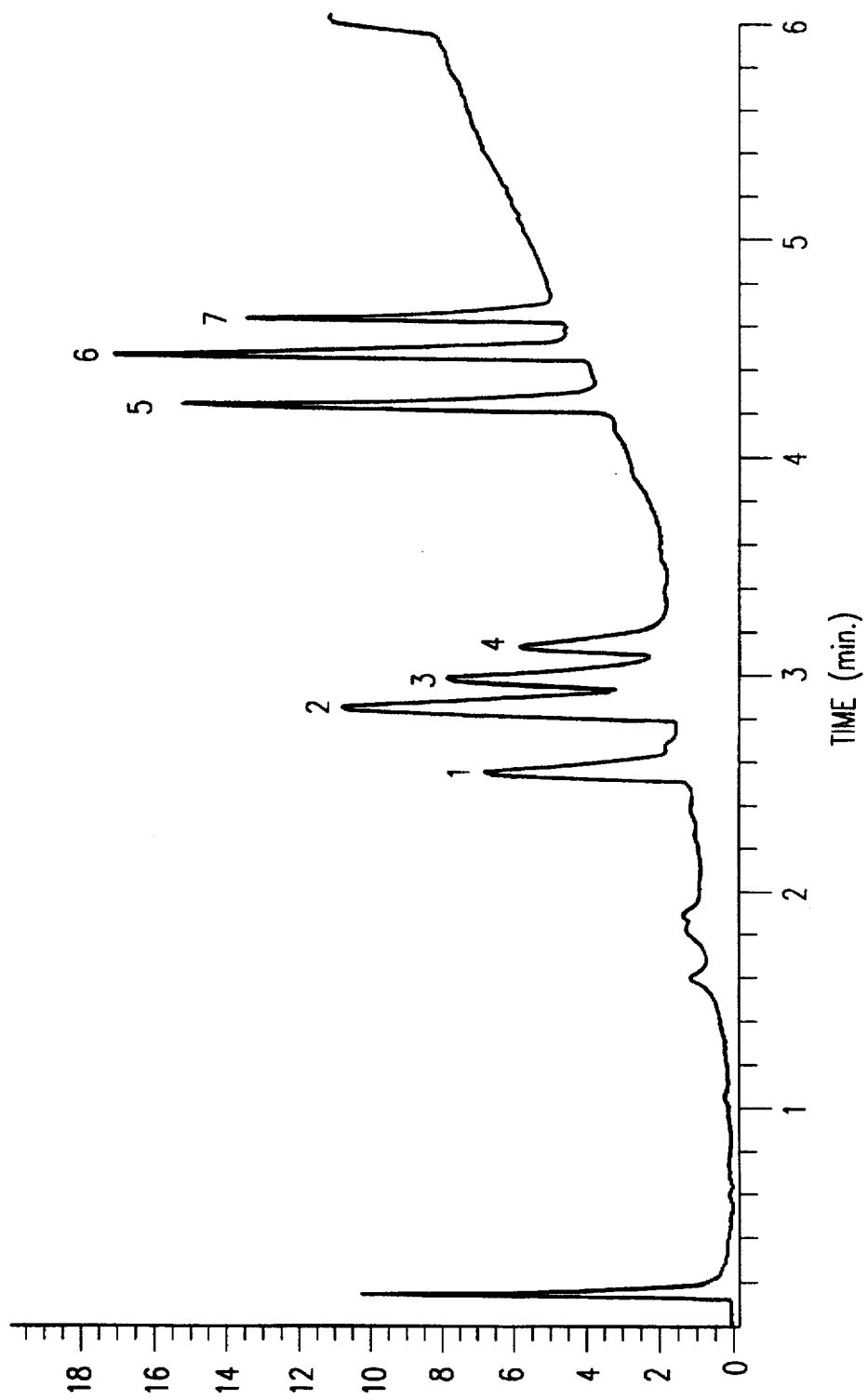
FIG. 5 shows the separation of octapeptides on Kovasil MS-DMB.

Separation of octapeptides on Kovasil MS-DMB. The seven octapeptides analysed have the following structure: Tyr-Ile-ProX-Ala-Glu-Lys-Ile with X: 1 X=Lys, 2 X=Asn, 3 X=Ala, 4 X=Glu, 5 X=Iie 6 X=Phe 7 X=Leu. Experimental: column: 33×4.6 mm; elution mode: multilinear gradient by mrixing A and B where eluent A is a mixture of AN/W=3/97 and eluent B is AN/W =90/10 both containing 0.05% trifluoroacetic acid (TFA); elution program: 0→3 min 1→9.7% B, 3→7 min 9.7→50% B, keep and return; flow rate: 1.5 ml $min^{-1}$; pressure at start: 22 MPa; temperature: 40° C.; detector: UV 215 nm (see FIG. 5).

EXAMPLE 7

Figure 6:
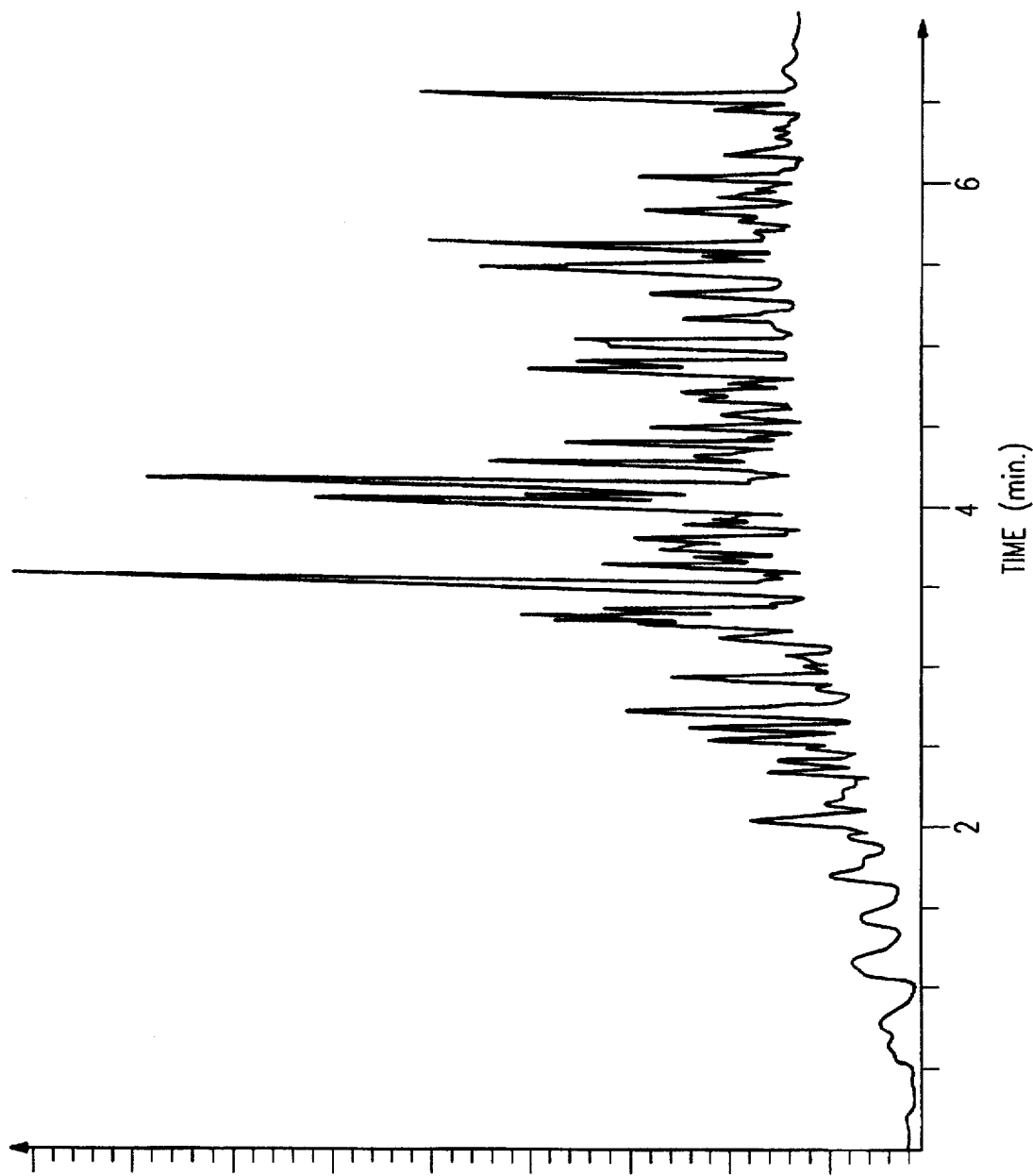
FIG. 6 shows the separation of trypsin digest of serum albumin on Kovasil MS-DMB.

Separation of frypsin digest of serum albumin on Kovasil MS-DMB. Experimental: column: 66×4.6 mm; elution mode: multilinear gradient by mixing A and B where eluent A is a mixture of AN/W=2/98 and eluent B is AN/W=90/10 both containing 0.1% trifluoroacetic acid (TFA); elution program: 0→1.8 min 5→12% B, 1.8→3.8 min 12→32% B, 3.8→6 min 32→50% B, keep and return; flow rate: 1.4 ml $mim^{-1}$; pressure at start: 37 MPa; temperature: 37° C.; detector: UV 215 nm (see FIG. 6).

EXAMPLE 8

Figure 7:
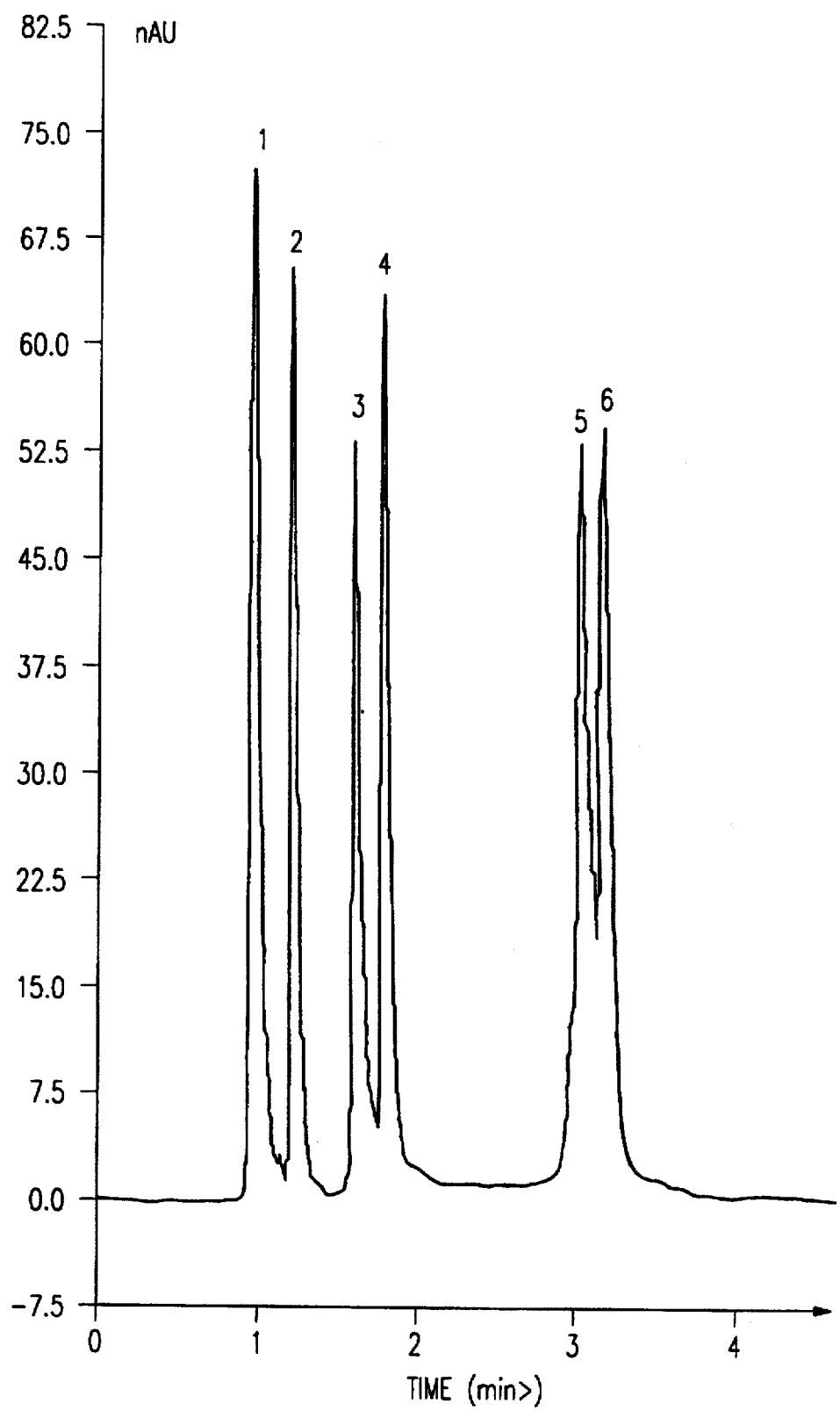
FIG. 7 shows the separation of a proteins on Kovasil MS-C14.

Separation of proteins on Kovasil MS-C14. Components: 1 insulin (bovin), 2 insulin (porcine), 3 cytochrom C (horse), 4 cytochrom C (bovin), 5 β-lactoglobulin B, 6 β-lactoglobulin A. Experimental: column: 33×4.6 mm; elution mode: linear gradient by mixing A and B where eluent A is a mixture of AN/W=5/95 and eluent B is AN/W=90/10 both containing 0.12% trifluoroacetic acid (TFA); elution program: 0→3.5 min 7→45% B, keep and return; flow rate: 1.6 ml $min^{-1}$; pressure at start 33 MPa; temperature: 37° C.; detector: UV 215 nm (see FIG. 7).

REFERENCES

1. Melander, W. R. and Horvath, Cs.; in Horvath, Cs. (ed.), High Performnnce Liquid Cihrontafography—Advances and Perspectives, Vol. 2, Academic Press, New York 1980
2. Jelinek, L., Erbacher, C., sz. Kovats, E., EiLropean Patent 0 574 642 A1 (1992)

What is claimed is:

1. A method for the rapid chromatographic analysis of biomolecules, the method comprising:

preparing an adsorbent, the adsorbent comprising redispersable, non-porous, monosized silicon dioxide microspheres covered with a dense layer of triorganyl-silyl groups, selected from the group consisting of 3,3 dimethylbutyldimethylsilyl and tetradecyldimethylsilyl, the microspheres having a particle diameter of about 1.5 μm, packing a chromatographic column with the adsorbent, using the packed chromatographic column for chromatographically separating biomolecules, and analyzing eluted biomolecules with a detector.

2. The method of claim 1, wherein the step of preparing the adsorbent comprises covering the microspheres with a dense layer of 3,3 dimethylbutyldimethylsilyl groups to thereby prepare an adsorbent with a relatively hard surface.

3. The method of claim 1, wherein the step of preparing the adsorbent comprises covering the microspheres with a dense layer of tetradecyldimethylsilyl groups to thereby prepare an adsorbent with a relatively soft surface.

* * * * *

UNITED STATES PATENT AND TRADEMARK OFFICE
CERTIFICATE OF CORRECTION

PATENT NO. : 5,762,803
DATED : June 9, 1998
INVENTOR(S) : Ervin Kovats, Laszlo Jelinek, and Robert Ohmacht It is certified that error appears in the above-identified patent and that said Letters Patent is hereby corrected as shown below:

On the front page, Col. 1, section [30] Foreign Application Priority Data is omitted. It should read -- European Patent Application No. 94810428.6 which was filed July 20, 1994 --.

Signed and Sealed this

Tenth Day of August, 1999

*Attest:*

Q. TODD DICKINSON

*Attesting Officer*   Acting Commissioner of Patents and Trademarks